Oct. 19, 1954  J. E. BYWATER  2,692,148
IMPLEMENT MOUNTING FOR TRACTORS
Filed July 5, 1951

J. E. BYWATER
INVENTOR.

BY
ATTORNEYS

Patented Oct. 19, 1954

2,692,148

UNITED STATES PATENT OFFICE 2,692,148

IMPLEMENT MOUNTING FOR TRACTORS

James Edward Bywater, Barking, England, assignor to Ford Motor Company, Dearborn, Mich., a corporation of Delaware Application July 5, 1951, Serial No. 235,315

Claims priority, application Great Britain July 20, 1950

1 Claim. (Cl. 280—460)

This invention relates generally to an implement mounting for a tractor.

It is conventional construction, in connection with tractors of the type having a pair of laterally spaced lower links universally connected at their opposite ends to the tractor and to the implement respectively, to provide stay bars having their forward ends pivotally connected to the tractor axle and their rearward ends pivotally connected to the implement or drawbar for the purpose of stabilizing the lower links and preventing lateral movement thereof. These stay bars are used particularly with implements for crop cultivation and also when towing trailers and the like since under these conditions it is desirable to prevent lateral movement of the lower links when turning the tractor.

An object of the present invention is to provide an improved form of mounting in which the lower links and implement are held against lateral movement relative to the tractor and in which this is accomplished with a minimum of parts and connections. In one form of the invention a pair of chains are utilized, each having its forward end connected to an intermediate point on one of the lower links and its rearward end connected to a common central point on the drawbar or implement. In an alternate form of the invention the chains are replaced by articulated links.

Another feature of the invention is the pivotal connection of the chains or articulated links to the drawbar or implement substantially in alignment with a line joining the pivotal connections of the lower links with the drawbar or implement. With this arrangement the construction is stabilized regardless of the vertical position of the drawbar or implement relative to the tractor.

Other objects and advantages of the invention will be made more apparent when considered in connection with the drawings, wherein.

Figure 1:
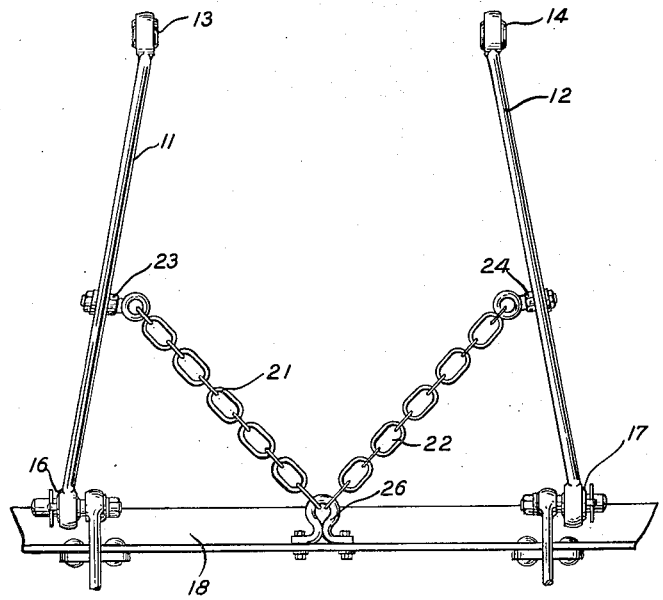
Figure 1 is a plan view of a mounting embodying the present invention.

Referring now to the drawings, the reference characters 11 and 12 indicate a pair of lower links adapted to be connected at their forward ends 13 and 14 respectively to a tractor (not shown) and at their rearward ends 16 and 17 respectively to the forward cross bar 18 of an implement. The forward connections 13 and 14 are universal type connections, as are the connections 16 and 17 at the rearward ends of the links, to permit lateral as well as vertical movement thereof since this is necessary in certain types of agricultural operations. When, however, the tractor is used with a planter, seeder, row crop cultivator or other type of implement in which it is desirable to prevent lateral movement of the implement relative to the tractor, a pair of removable chains 21 and 22 are utilized.

The chains 21 and 22 are connected at their forward ends to eyebolts 23 and 24 removably secured to the links 11 and 12 respectively intermediate their forward and rearward ends. The rearward ends of the chains 21 and 22 are connected to an eyebolt 26 secured to the implement cross bar 18. It will be noted that this arrangement is such that the effective point of connection of the chains to the eyebolt 26 on the implement is substantially in alignment with a line interconnecting the pivotal connections between the rearward ends 16 and 17 of the links to the implement. With such an arangement the chains will maintain the stability of the implement at all times without requiring adjustment. If, however, a limited lateral movement is desired, the chain, of course, may be made slightly longer.

Figure 2:
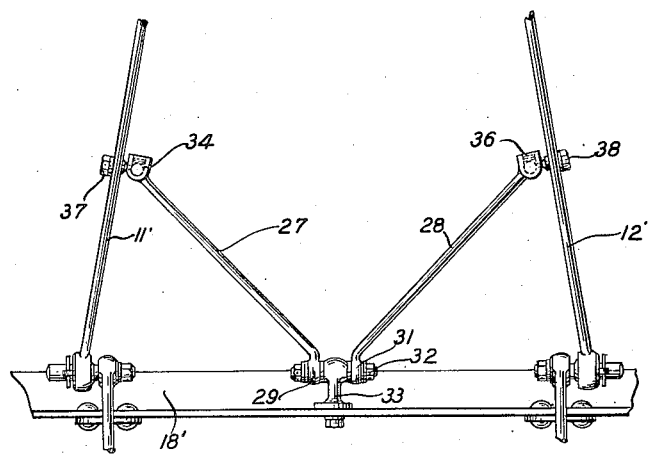
Figure 2 is a plan view of a modification.

Referring now to the modification shown in Figure 2, it will be noted that the chains have been replaced by articulated links 27 and 28 having their rearward ends formed with eyes 29 and 31 pivotally mounted upon a pivot pin 32 carried by a bracket 33 mounted upon the implement cross bar 18'. Here again it will be noted that the pivot pin 32 is in alignment with the pivotal connections between the rearward ends of the links 11' and 12' with the implement 13'. The forward ends of the articulated links 27 and 28 are formed with sockets 34 and 36 receiving the ball shaped ends of studs 37 and 38 removably mounted upon intermediate portions of the lower links 11' and 12' respectively. It will be apparent that the articulated links 27 and 28 perform the same function as the chains of the embodiment shown in Figure 1.

While the drawings show the mounting in connection with an implement, it will be understood that the chains and the articulated links may also be used in connection with a conventional drawbar which would then be connected to the rearward ends of the lower links in the same manner as the cross bar 18 of the implement. The eyebolt 26 and the pivot bracket 33 would then be attached to a central portion of the drawbar in the same manner in which they are shown attached to the cross bar of the implement.

It will be understood that the invention is not to be limited to the exact construction shown and described, but that various changes and modifications may be made without departing from the spirit and scope of the invention, as defined in the appended claim.

What is claimed is:

Means for attaching an implement to a tractor comprising a pair of laterally spaced forwardly converging links each universally connected at its forward end to said tractor and each universally connected at its rearward end to said implement, an eyebolt mounted upon each of said links at points intermediate the connections of said links to said tractor and to said implement, said eyebolts being transversely aligned with each other and facing inwardly toward each other, a single eyebolt mounted upon said implement equidistant between the connections of said links to said implement and transversely aligned with said last mentioned connections, and a pair of diagonally disposed link chains having their forward ends connected to the eyebolts mounted on said links and their rearward ends pivotally connected to the single eyebolt on said implement for rotation about a transverse horizontal axis common to and coinciding with the axis joining the connections of said links to said implement to maintain said link chains taut and restraining lateral movement of said links and said implement relative to said tractor irrespective of the height of said links and said implement relative to said tractor.

References Cited in the file of this patent
UNITED STATES PATENTS

| Number | Name | Date |
|---|---|---|
| 2,347,898 | Ferguson | May 2, 1944 |
| 2,453,390 | Werner | Nov. 9, 1948 |
| 2,461,885 | Estes | Feb. 15, 1949 |